Patented Feb. 7, 1950

2,496,678

UNITED STATES PATENT OFFICE 2,496,678

GINGERBREAD MIX

Paul W. Salo and Louis J. Huber, Minneapolis, Minn., assignors to General Mills, Inc., a corporation of Delaware No Drawing. Application November 2, 1946, Serial No. 707,534

5 Claims. (Cl. 99—94)

The present invention relates to a gingerbread mix and to a process of producing the same.

Prepared mixes for gingerbread usually contain flour, shortening, molasses, sugar, baking powder, and other minor flavoring ingredients. One of the principal problems in preparing these mixes is that of converting the molasses from its liquid condition into a solid without adversely affecting the baking qualities of the product. At present the incorporation of the molasses is handled in several ways. According to one method the molasses is completely dried and ground to a fine powder, which is subsequently blended into the flour mix. The drying of the molasses is done either by spray, drum, or kettle drying, usually to a moisture content of 2% or less. This drying of the molasses is a difficult problem, particularly where it is desired to preserve the flavor characteristics of the molasses. Another method of incorporating the molasses is to emulsify the molasses with the shortening and then to dry the emulsion to a form capable of being powdered. The dry emulsion is then ground and incorporated with the remainder of the dry ingredients. Another method involves blending the molasses into the flour to form a dough, which is subsequently dried and ground. Both the emulsion and the dough are extremely difficult to dry. Low temperatures must be maintained, necessitating the use of long time periods or vacuum equipment or both.

We have now found that a superior gingerbread mix with longer storage life and with very desirable baking and flavor characteristics can be produced by a new method which involves forming a molasses and flour premix which preferably contains a small amount of shortening, to which the remaining ingredients of the preparation are added.

It is, therefore, an object of the present invention to provide a novel gingerbread mix.

It is another object of the present invention to provide a process of preparing such a mix.

In general, the invention involves the preliminary drying of flour from its normal moisture content of about 12–15% down to a level within the range of less than 1% to 7%. The molasses is concentrated from a moisture level of approximately 20% to a level of about 4% to 10%. A small amount of liquid shortening is incorporated in the dry flour after which the hot concentrated molasses is blended in and the mixture thoroughly agitated. The mixing spreads the molasses on the surface of the flour particles to a large extent and only a relatively small portion of molasses is present in the mix in the form of solidified molasses particles. In this manner the molasses is readily soluble and dissolves quickly when the mix is used in baking. After agitating, the premix is passed through a cooling jacket and is properly sized. Thereafter the remaining constituents, namely sugar, the balance of shortening, powdered milk, baking powder, salt, and a spice blend are incorporated in the premix and thoroughly distributed therethrough.

The following example will serve to illustrate the invention.

Example

The ingredients employed in the mix are as follows:

| | Pounds |
|---|---|
| Molasses (21% moisture) | 23 |
| Flour (13% moisture) | 63 |
| Liquid shortening | 4 |
| Sugar | 22 |
| Hydrogenated shortening | 11 |
| Powdered milk | 3 |
| Baking powder | 2 |
| Salt | 1 |
| Spice blend | 1 |

The molasses is concentrated to a moisture of 6% by drum drying on a roll heated by internal steam at a pressure of 60–100 pounds per square inch. Under these conditions a time interval of approximately .02 to .06 minute has been found to be all that is necessary for the requisite amount of drying.

The flour is dried from its original moisture content to a moisture content of 3% by running the flour through tubular steam type drier in which the flour remains for approximately twelve minutes and exits at a temperature of about 180° F. This low moisture flour is then intimately mixed with 5% liquid shortening, based on the weight of the original flour, and at a temperature of about 180° F. has incorporated into it a stream of molasses which leaves the drying rolls at about 220° F. The mixture is then thoroughly agitated to spread the molasses on the surface of the flour particles, after which the entire granular mass is passed through a cooling jacket and is properly sized.

Thereafter the remaining ingredients of the mix are incorporated and agitated until thoroughly distributed. In order to prepare a product of high stability, the moisture content of the final product should not substantially exceed about 6%.

Among the advantages of the present process are included the following:

(1) The moisture content of the flour is reduced beyond the critical moisture content for starch gelatinization before the flour is subjected to any temperature which would cause gelatinization. It is thus possible to mix the flour with the molasses while the latter is at an elevated temperature without adversely affecting the baking properties of the flour.

(2) The heat treatment of the flour during this drying and mixing operation improves the gluten of the flour and improves the baking quality of the mix.

(3) The molasses is dried very rapidly and is exposed to elevated temperatures for a minimum amount of time, thus preventing discoloration and excessive breakdown of the sugars.

(4) The titratible acidity of the mix is reduced to a minimum.

(5) The over-all moisture content of the mix is low and this results in greater stability of the baking powder and improves keeping qualities.

(6) There is a reduced tendency for the mix to cake.

It will be apparent that the particular proportion of ingredients is not critical and that considerable variation is possible in the relative amount of each ingredient depending on the type of product desired.

Numerous variations are also possible in the processing steps. For example, the small amount of shortening may be eliminated from the premix, although very definite advantages are obtained by employing the shortening at this point. Likewise, while it is preferred to employ ordinary atmospheric drying for the flour and molasses for low cost and simplicity, it will be apparent that vacuum drying may be employed although it entails greater cost in equipment and operation.

It is to be understood that the term "gingerbread mix" as used herein is intended to include such products as are useful for the production of gingerbread, cookies, etc. Formula variations may be desirable for the different uses to which the product is to be put, but they all embody the essential features of the present invention, namely the drying of the flour and molasses separately, and accordingly are appropriately included in the term "gingerbread mix."

It is likewise apparent that other variations in the process may be made without departing from the spirit of the invention, and accordingly it is understood that the invention is not to be limited by any specific example, but only by the appended claims.

We claim as our invention:

1. The process of preparing a gingerbread premix which comprises drying flour to a moisture content not substantially in excess of 7%, concentrating molasses to a moisture content within the approximate range of 4% to 10%, mixing the concentrated molasses and the dried flour and thoroughly incorporating the molasses in the flour.

2. The process of preparing a gingerbread premix which comprises drying flour to a moisture content not substantially in excess of 7%, drum drying the molasses to a moisture content within the approximate range of 4% to 10% and at a temperature not substantially in excess of 220° F., continuously mixing a stream of the concentrated molasses at about its final concentrating temperature with a stream of the dried flour while the latter is at a temperature not substantially in excess of 180° F., and thoroughly incorporating the molasses in the flour.

3. The process of preparing a gingerbread premix which comprises drying flour to a moisture content within the approximate range of 1% to 7%, intimately mixing with the dried flour a small amount of liquid shortening, concentrating molasses to a moisture content within the approximate range of 4% to 10%, mixing the concentrated molasses and the dried flour and thoroughly incorporating the molasses in the flour.

4. The process of preparing a gingerbread mix which comprises drying flour to a moisture content not substantially in excess of 7%, concentrating molasses to a moisture content within the approximate range of 4% to 10%, mixing the concentrated molasses and the dried flour and thoroughly incorporating the molasses in the flour, and thereafter incorporating the remainder of the ingredients into the mix, the major proportion of the shortening being incorporated last.

5. The process of preparing a gingerbread mix which comprises drying flour to a moisture content within the approximate range of 1% to 7%, intimately mixing with the dried flour a small amount of liquid shortening, drum drying the molasses to a moisture content within the approximate range of 4% to 10% and at a temperature not substantially in excess of 220° F., continuously mixing a stream of the concentrated molasses at about its final concentrating temperature with a stream of the dried flour while the latter is at a temperature not substantially in excess of 180° F., thoroughly incorporating the molasses in the flour, and thereafter incorporating the remainder of the ingredients into the mix, the major proportion of the shortening being incorporated last.

PAUL W. SALO.
LOUIS J. HUBER.

REFERENCES CITED

The following references are of record in the file of this patent:

UNITED STATES PATENTS

| Number | Name | Date |
|---|---|---|
| 1,005,536 | Goodlet | Oct. 10, 1911 |
| 1,931,892 | Duff | Oct. 24, 1933 |
| 1,945,918 | Schmidt | Feb. 6, 1934 |
| 2,253,319 | Batterman | Aug. 19, 1941 |
| 2,319,579 | Black | May 18, 1943 |

FOREIGN PATENTS

| Number | Country | Date |
|---|---|---|
| 21,472 | Great Britain | of 1904 |
| 439,595 | Great Britain | Dec. 10, 1935 |

OTHER REFERENCES

Berolzheimer, Am. Woman's Cook Book, Consolidated Book Publishers, Chicago (1945), page 498.